Aug. 9, 1966  F. E. MATTHEWS  3,265,059
ISOLATOR ASSEMBLY

Filed Feb. 21, 1962  5 Sheets-Sheet 1

INVENTOR
*Frank E. Matthews*

BY *Mason, Fenwick & Lawrence*
ATTORNEYS

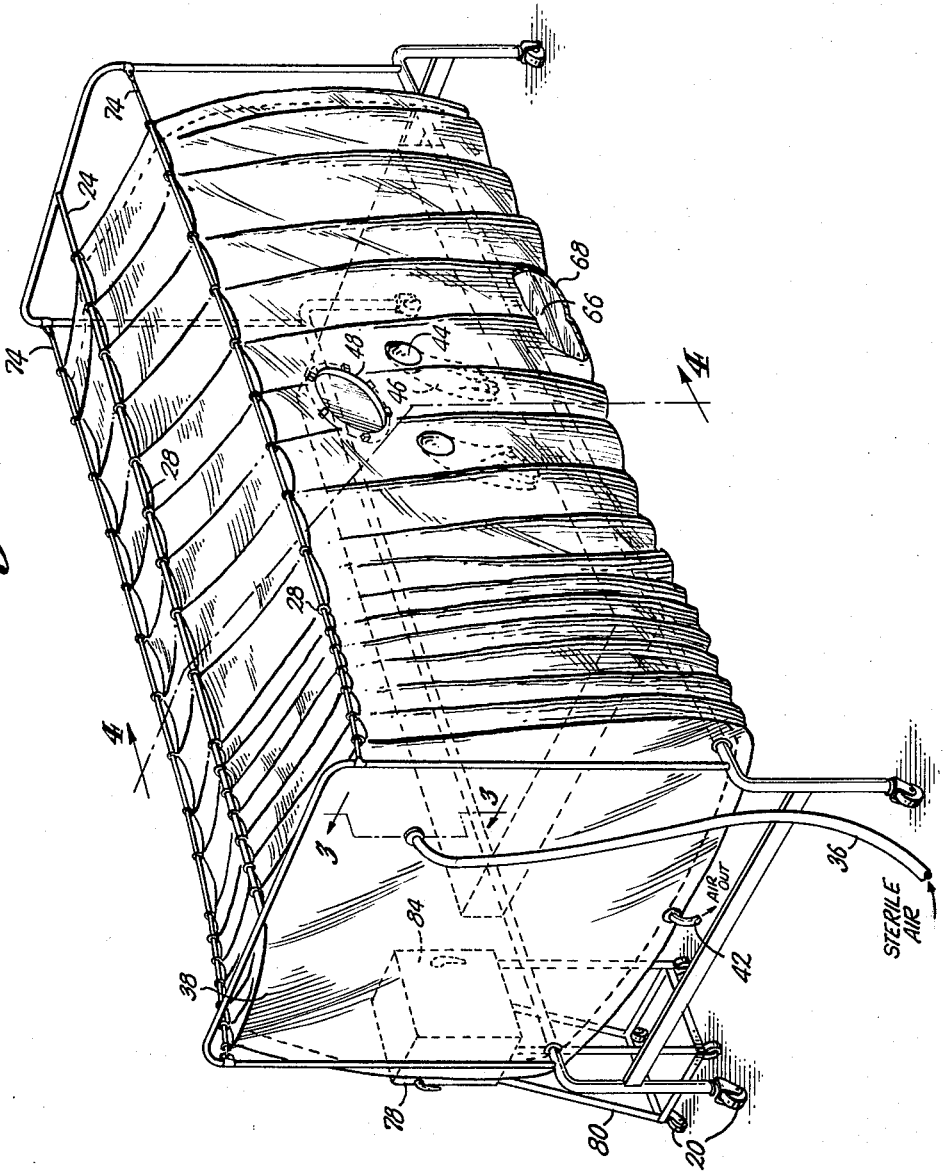

Aug. 9, 1966  F. E. MATTHEWS  3,265,059
ISOLATOR ASSEMBLY
Filed Feb. 21, 1962  5 Sheets-Sheet 3
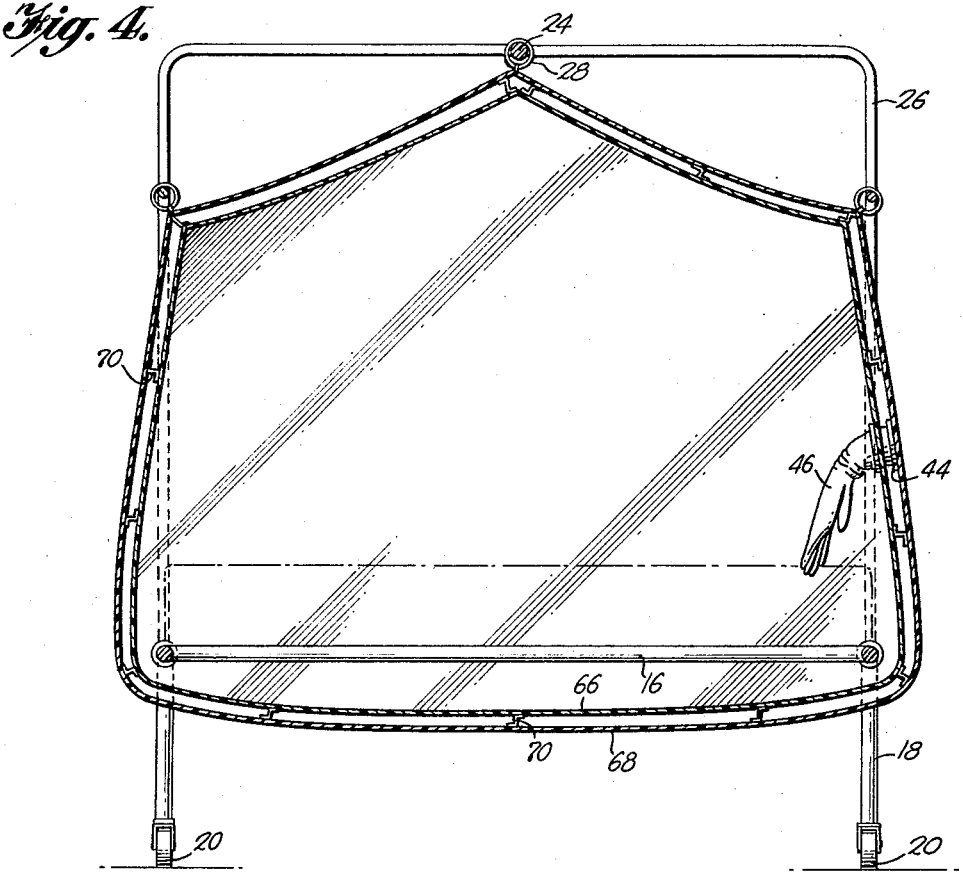
Fig. 4.
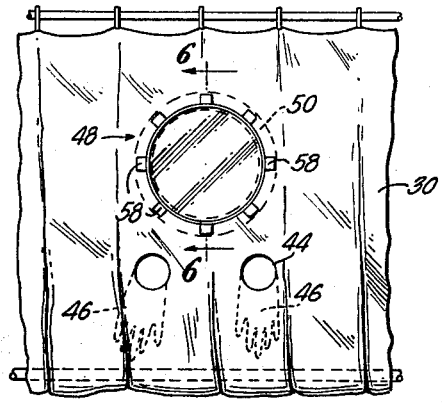
Fig. 8.
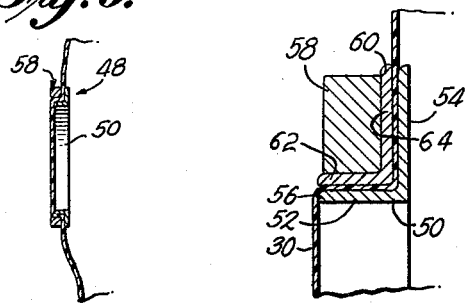
Fig. 9.
Fig. 10.
INVENTOR
Frank E. Matthews
BY Mason, Fenwick & Lawrence
ATTORNEYS Aug. 9, 1966      F. E. MATTHEWS      3,265,059
ISOLATOR ASSEMBLY
Filed Feb. 21, 1962      5 Sheets-Sheet 4

INVENTOR
Frank E. Matthews
BY
Mason, Fenwick & Lawrence
ATTORNEYS

Aug. 9, 1966    F. E. MATTHEWS    3,265,059
ISOLATOR ASSEMBLY
Filed Feb. 21, 1962    5 Sheets-Sheet 5

INVENTOR
*Frank E. Matthews*

BY *Mason, Fenwick & Lawrence*
ATTORNEYS

United States Patent Office 3,265,059
Patented August 9, 1966

3,265,059
ISOLATOR ASSEMBLY
Frank E. Matthews, Falls Church, Va., assignor to Matthews Research, Inc., Alexandria, Va., a corporation of Virginia
Filed Feb. 21, 1962, Ser. No. 174,843
20 Claims. (Cl. 128—1)

This invention relates generally to a working area assembly which may be isolated from its environment. More specifically, the present invention relates to an assembly apparatus capable of forming an enclosed volume which may be maintained completely separate from its environment and does not permit any undesirable ingress or egress.

The concept of an isolated volume which, for instance, may be used as a completely sterile atmosphere or as a germ breeding atmosphere, or even as a dust free or completely opaque isolated atmosphere, is well known in the art. However, prior known means for accomplishing complete and effective separation of one volume from another volume have left much to be desired. Some prior isolation chambers did not permit easy access into the chamber, which is of course, an essential feature of any effective isolated volume. Moreover, and very significantly prior apparatus did not permit complete freedom of movement and working of an operator within the isolated volume while completely protecting and safeguarding the isolation. In an isolation chamber, for instance, such as a sterile atmosphere for a patient or animal, it is important that the enclosed atmosphere or volume be maintained sterile and yet the operator must be permitted to perform certain functions anywhere within the isolated volume. Such functions might include various treatments of the patient or animal as are necessary.

The prior art attempts in producing an effective isolation chamber also did not take into consideration the importance of providing the operator at the outside of the isolation chamber with proper vision during any and all functions performed within the chamber. While various window-like means have been provided, such window means have not been effectively or satisfactory in rigid enclosures, for the reason that they do not follow the operator as he moves. In the alternative, when a flexible substantially transparent film has been used as the means for forming the isolation chamber, no recognition had been given to the problem created by the obscured vision of the operator, due to the wrinkles or wave-like form inherently induced in the film as the operator performs a desired function through conventional hand ports in the side of the film. Further, when the operator is required to move into facial contact with the flexible film to achieve maximum working access within the enclosure, the film will conform to the operator's face and hinder if not prevent breathing. Consequently, such a flexible film enclosure was not completely satisfactory.

While it is admittedly old and well known to pressurize the interior of an enclosure, it has been found to be important to maintain the volume within the enclosure as constant as possible, in order that the pressure within the isolated volume does not change substantially, since such pressure changes could either cause leakage into, or the mixing of the environment with, the isolated volume. As is manifest, the problem of maintaining a constant volume is substantially nonexistent in a rigid enclosure. However, rigid enclosures have the disadvantage of being relatively expensive; and, also, are undesirable from the standpoint of permitting limited working within all portions of the isolated chamber. It has been recognized that easy workability and also low cost are attendant advantages of using a flexible film enclosure which necessitate the solution to the problem of maintaining the volume constant, or at least relatively constant, to thus maintain a predetermined pressure level within the environment.

Accordingly, it is a primary object of the present invention to provide an isolated volume assembly which will provide easy access to any and all portions of the volume.

It is also an object of this invention to provide an isolated volume working assembly composed of a flexible film, which will permit the operator to move from one end of the area to another through one pair of conventional hand ports for performing any function within the isolated volume.

Another important object of the present invention is to provide an isolation chamber assembly made of a flexible film, which will maintain a substantially constant pressure and volume while an operator is performing a function within the volume.

A further important object of the present invention is the provision of an isolation chamber assembly which is adapted to slidably receive a conventional patient support or working table within but is isolated from the interior of the concentric isolation chamber.

Yet a further object of the present invention is the provision of a moving support for a light and/or tools positioned within the isolation chamber assembly which automatically moves with the operator.

It is also an object of this invention to provide an isolation chamber assembly composed of flexible film which at all times provides clear vision for the operator working through conventional hand holes or the like, that may be provided in the side of the chamber.

It is a further object of the present invention to provide means for selectively permitting any physical exchange between the isolated volume and the environment without disrupting or endangering the separation created by the isolation chamber.

Other objects and advantages of the present invention will become apparent to those skilled in the art, from the following description when read in conjunction with the accompanying drawing, wherein:

FIGURE 2 is a perspective view, partially broken away, of another embodiment of the present invention, showing a double wall thickness and also supports for the flexible film along a plurality of aligned points;

FIGURE 3 is a cross-sectional view taken along lines 3—3 of FIGURE 2;

FIGURE 4 is a cross-sectional view taken along lines 4—4 of FIGURE 2, showing the double wall thickness as well as the glove ports;

FIGURE 8 is a side view in elevation, showing the relative positions of the viewing means and the glove ports;

FIGURE 9 is a cross-sectional view taken along lines 9—9 of FIGURE 8, showing the complementary rings used to maintain the flexible film taut for proper viewing;

FIGURE 10 is a modification of the means for maintaining the flexible film taut.

In the specification and claims, the terms enclosure, volume, chamber, and atmosphere are to be considered synonomous.

Briefly, the present invention comprises a working area assembly including an isolated volume or chamber formed of a flexible film which encloses a working area surface, that may be a bench or bed, or the like. This film is designed to be at least twice the longitudinal extent of the working area surface, and also designed to hang or drape loosely below the bottom of the working area surface. The excess material in the enclosure, due to its length being at least twice that of the working area surface, provides a plurality of vertical folds hanging loosely at the sides and beneath the working area surface and its support, which are designed to effect a substantially constant volume and pressure within the isolation chamber, notwithstanding the normal movement of the operator at the side of the enclosure. Conventional glove ports are provided in the side of the flexible film enclosure, and due to the extra length of the film enclosure relative to the working area surface, the glove ports may be moved from one end of the surface to the other. Viewing into the working area is accomplished by viewing means which retains the flexible film taut in a manner that will provide relatively unobscured vision through the viewing means, and also which will move with the glove ports along the working area surface. To obtain the proper vision through the film, the viewing means comprises at least one ring or frame and magnetic means holding the film stretched over the ring. To allow partial penetration of the head of the operator the frame can also be made of multiple planes as well as a single plane. The frame will prevent billowing of the material into the operator's face that would restrict breathing and present unsanitary conditions.

Figure 1:
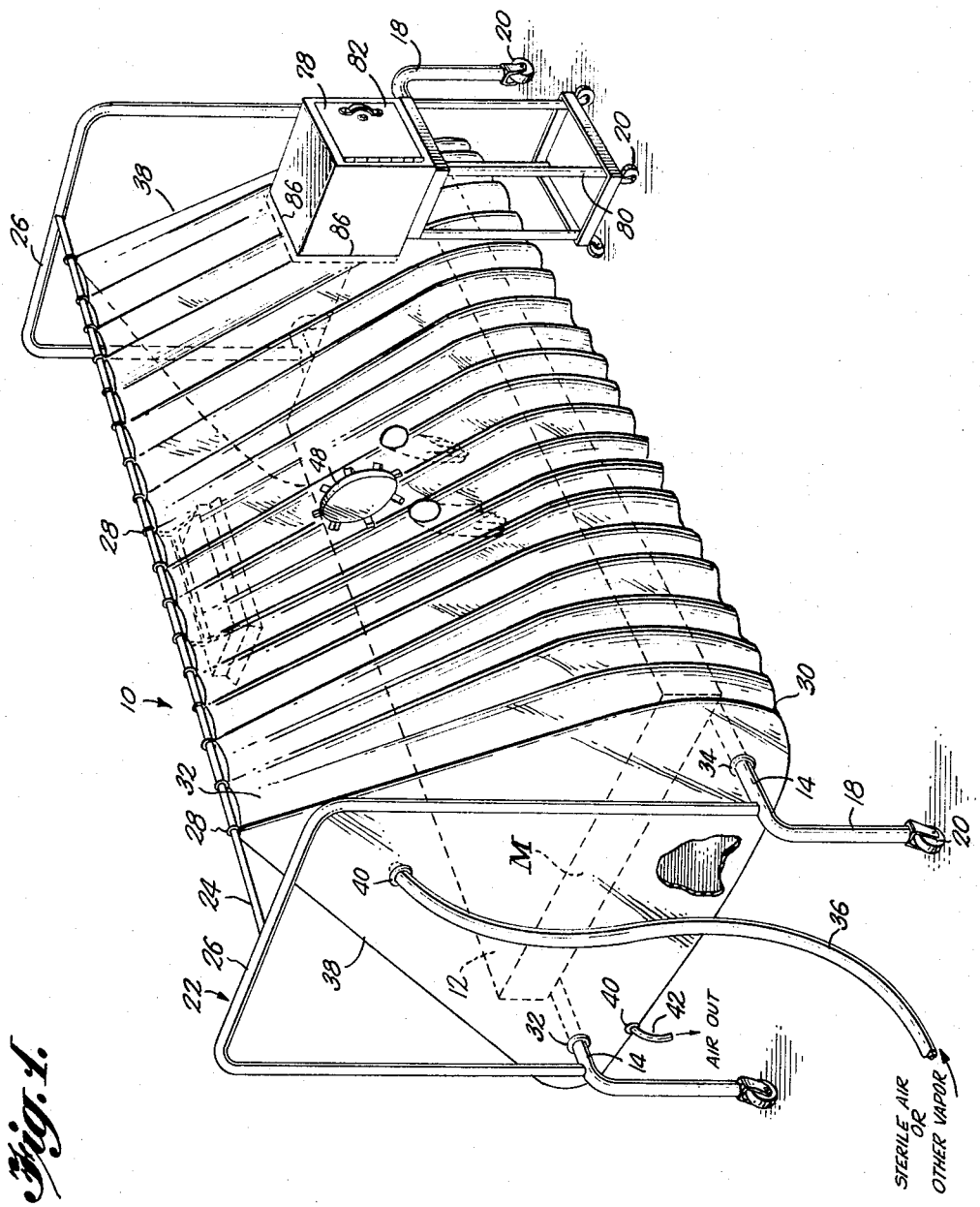
FIGURE 1 is a perspective view of an enclosed working area assembly, partially broken away, showing the support for the flexible film and a moving support for a light and/or tools to be at a plurality of aligned points, and also wherein the flexible film is of single wall thickness.

The embodiment of the present invention shown in FIGURE 1 is the simplest and most basic design incorporating the features of the present invention. As shown, the isolation chamber or volume assembly designated generally at 10, includes a working area surface 12 which may be formed from a bench, platform, mattress, or similar surface. The mattress M would be used to support a patient, while in the other forms, the surface might be used to support animal cages or other living matter, which include microorganisms as well as vegetation. It is also conceivable that the working area surface can be used as a support for various articles, if for instance, a dust free or particular lighting effect atmosphere is desired. The working area may be an enclosed machine such as used for machining beryllium which gives off harmful dust. The volume may be filled with an inert gas for the welding of titanium or as required to do chemical experiments where other than an air atmosphere is required. The surface 12 is conveniently supported in any suitable manner, such as by long tubular elements 14, which extend longitudinally of the working area surface 12. In the view of FIGURE 4, the tubular elements 14 are made integral, as by a plurality of cross bars 16. The tubular elements 14 are supported on the ground by means of legs 16, which may be integral with tubular elements 14, for convenience. As constructed, the legs 18 or any other supporting means for the tubular elements 14 do not extend beneath the surface 12, but rather, support the tubular elements and the surface 12 at a distance from either end of the surface, as best shown in FIGURE 1. As a matter of convenience, and not as a matter of necessity, the legs may be provided with conventional casters 20 for mobility, if desired.

Secured above the surface 12 in any suitable manner is a rigid frame 22, which includes at least one frame member 24, that is connected to a pair of inverted U-shaped end members 26, to provide a rigid support above the working area surface. The support member 24 can be suspended from a ceiling or cantilevered in any manner that holds it at the desired height above the work surface. Threaded on this frame member 24, as by conventional eyelets 28, is a flexible film enclosure 30. This flexible film is preferably composed of polyvinyl chloride, since it has been found that this material provides the best combination of transparency and flexibility. If transparency is not desired, or is not important, any other flexible material which is relatively impervious to those agents or materials for which a barrier is desired can be used. It is also contemplated that a completely opaque material of plastic or rubber might be used to shield the isolated volume from within the film, from light. While polyvinyl chloride has been found most desirable because of its great transparency, any other flexible and relatively strong film, either plastic, rubber or similar material, may be used.

The eyelets 28 are secured to the film 30 along a line shown in FIGURE 1, by any suitable means, which may include heat welding, adhesive or the like. It is also contemplated that the eyelet 28 may be connected to the film 30 by a biasing means, such as a spring or piece of stretchable rubber, not shown.

One of the significant features of the present invention is that the film 30, as it depends from the frame member 24, will hang in a number of vertical folds 32. These folds should be a few inches in width and extend from the member 24 and continue down the pyramidal shape of the enclosure and continue beneath the surface 12 and the tubular supporting elements 14. The flexible film should be at least twice the length of the surface 12, if it were extended completely. While the film hangs in folds freely beneath the supporting elements 14 and the surface 12, to complete the isolation and separation of the volume enclosed within the film and its environment, suitable seals of any conventional type may be provided at 34 to engage the tubular elements 14 and the film. The film 30 extends continuously around and out of contact with the working area surface 12 and actually forms a closed loop which contains and continuously surrounds surface 12. To provide sterile air into the isolation chamber or volume, the tube 36 is provided in the end wall 38 of the flexible film enclosure 30. The tube 36 may be conveniently sealed from leakage by any sealing means as at 40. An air outlet 42 is provided at the base of the enclosure similarly sealed as at 40. It is to be understood that while sterile air is mentioned, it is also possible that the tube 36 could be used for any treatment gas other than sterile air, according to the purposes for which the present isolation chamber is to be used. It is contemplated that in the event the chamber is to be maintained sterilized, a slight positive pressure should exist within the chamber as compared to the environment, in order that any leakage would be into the environment rather than back into the chamber.

Conventional glove or hand ports 44 are provided at any location in the side wall of the film longitudinally between the ends of the working area surface. These glove ports are secured and sealed to gloves 46, which provide working access into the isolation chamber. It is to be noted that it is only necessary to provide gloves such as at 46, to effect complete working access within the isolation chamber, due to the flexibility of the bag that the operator may upon insertion of his hands into the gloves 46, press his body against the side of the film and gain access across the surface 12. The excess material hanging below the surface 12 and its supporting tubular elements 14 would be more than sufficient to enable the operator to move across the surface 12. The amount of material necessary to permit this, in addition to the minimum double length of the flexible film enclosure 30 depends upon the width of the surface 12, and also the shape of the cross-sectional outline of the film above the surface, and would be well within the province of one skilled in the art. It can be said, however, that the amount of extra film material hanging below the tubular elements 14 should be sufficient to permit the operator to move across the width of the surface 12, or, in the case of two operators, one on each side, each should be able to reach halfway across the enclosure.

The minimum double length of the film is such as to form vertical folds 32, which enable the operator with his hands inserted in the gloves 46, to move longitudinally from one end of the surface 12 to the other. The particular positioning of the ports 44 and the gloves 46 along the side of the flexible film enclosure 30 is not important, as long as there is sufficient flexible film in the form of folds on either side of the glove ports to move the length of the bed. The minimum length of the flexible film between one glove port and end wall of the flexible film 38 is one full longitudinal length of the surface 12.

FIGURES 2, 3 and 4 depict a somewhat different embodiment of the present invention. However, all of the principles are still present. The assembly of FIGURE 1 shows a single wall film appropriate for positive internal pressure applications wherein leakages are designed to flow outwardly of the enclosure. This single wall construction is particularly useful when sterile or germ free atmospheres are desired. However, a single wall film enclosure would not be appropriate for use for the isolation of hazardous organisms, since in the latter case any leakage should be into the enclosure rather than out of the enclosure. Accordingly, the assembly of FIGURE 2 utilizing a double wall of film 30 consisting of inner and outer flexible film walls 66 and 68, respectively, is provided to protect the environment rather than the isolated volume.

These inner and outer walls 66 and 68 are prevented from parting more than a fixed distance by restraining links 70, suitably secured to the inner and outer film walls. As best shown in FIGURE 3, tube 36 is suitably secured as at 40 to the outer wall 68, and provides a positive pressure between the inner and outer walls. An orifice 72 is provided anywhere on the inner wall 66. In this manner the gas, which may be air, that is forced into the space between the walls, is permited to pass into the interior of the enclosure through inner wall 66, by means of the orifice 72. As can be seen, this arrangement protects the environment of the isolator chamber assembly from the contents of the chamber, for the reason that if leakage should occur in the inner wall 66, the higher pressure between the inner and outer walls will cause a flow of the gas between those walls into the chamber, rather than permit any contaminating material from within the isolated volume to pass outwardly into the environment, in which event, it could have extremely harmful results. Similarly a hole in the outer wall would only result in exchange of clean air to the environment. Thus, the double wall feature and the positive pressure within these walls acts as an effective safety feature.

The assembly apparatus of FIGURE 2 is further unique in that additional frame members 74 are provided adjacent the rigid frame member 24. These frame members 74 may be rigid as a metal bar or flexible and made of an elastic cord or other similar flexible material which may have some resiliency. By means of cords and pulleys rigid members may be adjusted in height of flexible members adjusted in tension. Eyelets 28 are provided on the edge of the enclosure 30, and are strung onto the frame member 74 in a manner similar to the stringing of the centrally located eyelets onto rigid frame member 74.

Figure 7:
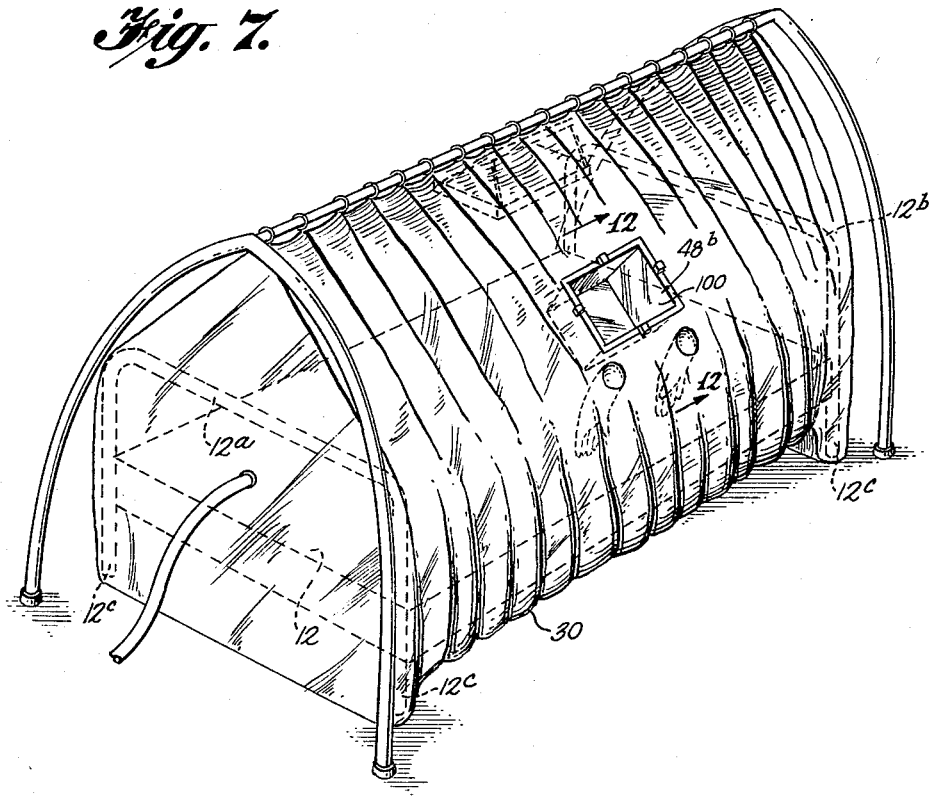
FIGURE 7 is a view in perspective of another embodiment of the present invention wherein the isolator assembly completely encloses a conventional patient support.

FIGURE 7 shows another embodiment of the present invention wherein the film 30 encloses the entire surface 12 which may be a bed or table as well as the conventional supports for a bed such as the head and foot board 12a and 12b, respectively, and their legs 12c. The film 30 may be of single or double wall thickness as desired. It will be understood that this embodiment permits the formation of an isolation chamber around a conventional bed or table.

In each of the embodiments of the enclosed or isolated working area assembly 10, there should be provided conventional gas locks 78, which are preferably maintained on movable stands 80, provided with casters 20. As is conventional, each of the gas locks is provided with an outer door 82 and an inner door not shown. In the usual conventional manner, the outer door may be opened and the usual chemicals such as phosphoric acid may be sprayed on the material placed into the lock, and after a suitable time the inner door opened to permit the article to gain admittance. It is also contemplated that in the case of animals or human beings, the lock 78 be large enough to accommodate either the person or the animal for admittance into the enclosure.

The lock 78 may be positioned at any particular location on the side of the film 30, and suitably secured and sealed at edges 86 in a well known manner. It is to be noted that the lock is intended to move the full length of the surface 12, as long a sufficient vertical folds of excess material are provided between the edge of the lock and an end 38.

Figure 5:
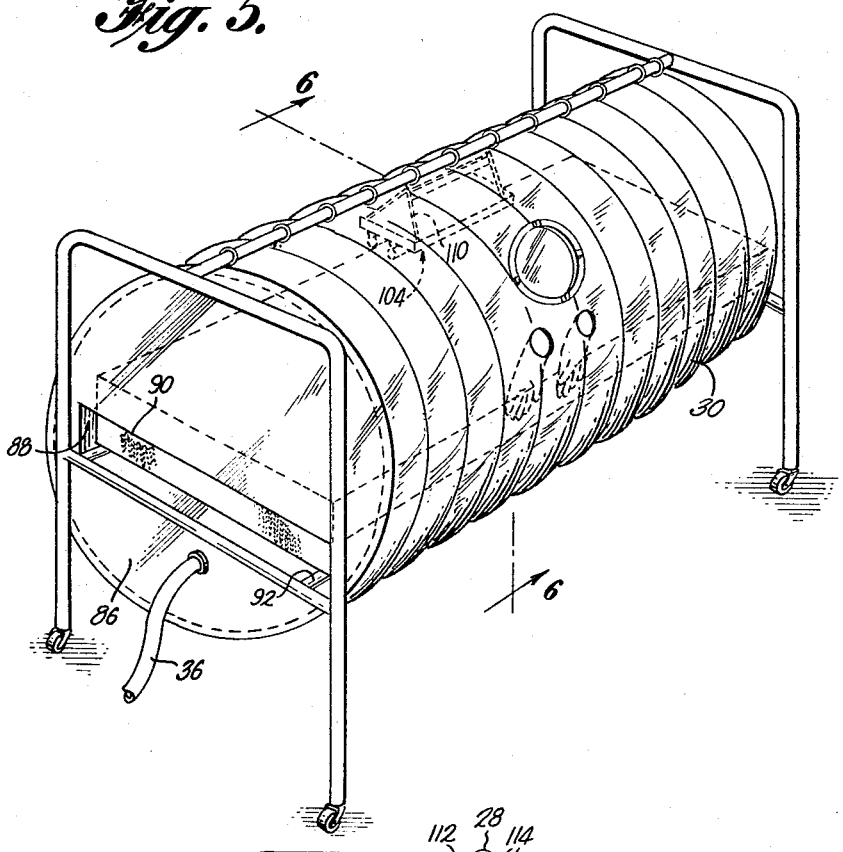
FIGURE 5 is a perspective view of a further embodiment of the present invention showing a conventional bed received into the tunnel formed within the isolation chamber assembly.
Figure 6:
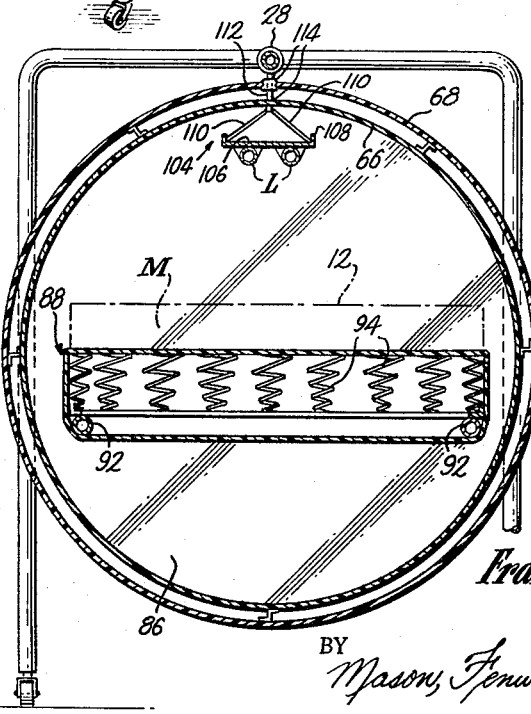
FIGURE 6 is a cross-sectional view along lines 6—6 of FIGURE 5.

FIGURES 5 and 6 depict another form of the present invention which incorporates unique features which permit the isolation chamber to be easily formed around a conventional bed or table which are used for support and yet does not require any treatment for the bed frame and springs for instance since these will be outside and separated from the isolated volume. Also the mechanism for raising and lowering the bed as commonly used will also be outside the chamber.

As shown the film 30 forming an enclosed working area assembly is composed of inner and outer walls 66 and 68 as described above. It is of course possible to use a single wall thickness if desired. The walls again should be twice the length of the working area surface 12 in order that working access be permitted to all portions of the surface. Ends 86 are preferably flexible and formed of the same film material 30 as the sides. It is of course possible to construct the ends 86 with a greater thickness than the sides in order to aid in shape retention of the chamber. To this extent of the construction the embodiment of FIGURES 5 and 6 is similar to that of the preceding embodiments. However, there is also included, as best shown in FIGURE 6, a tunnel 88 which is formed integrally with the ends 86 at openings in the form of rectangular slots 90 provided in these ends. The tunnel 88 is continuous and open ended to provide an unobstructed housing for receiving the conventional horizontal frame support members 92 which form the basis for the support for the springs 94. As shown in FIGURE 6, the lateral extent of the tunnel is less than the width of the film enclosure, thus forming an air space between the side of the tunnel and the side of the film enclosure. A mattress M or similar patient support may be superposed on the tunnel 88 as shown to provide a working area surface 12. It is of course obvious that the mattress may be omitted and any other support may be substituted. It is also possible that the top of the tunnel 88 may be used to provide the working area surface.

While FIGURES 5 and 6 disclose the use of a conventional hospital bed to form the enclosed working area assembly 10, it is to be understood that any support such as a conventional table or work bench may be received within the tunnel 88 as a support for the surrounding, though not communicating, isolated volume within the film 30. The advantages of this construction should be evident in that all that is received within the tunnel 88 need not be sterilized or otherwise treated as would be necessary to be received within the isolated volume. Since the film and ends and tunnel are preferably flexible, the legs of a table or bed can be threaded through the tunnel 88 of the film enclosure when collapsed. Once the tunnel 88 extends its full length and houses the springs 94 and frame 92 of a bed, for instance, the chamber may be inflated by means of hose 36 and the isolated volume formed.

In order to provide unobscured vision for the operator as he moves longitudinally along the length of the bed, viewing means shown generally at 48 is provided. This viewing means is important, in view of the fact that even though the flexible film when made of polyvinyl chloride is substantially transparent, such material at times would provide a wavy, unclear and unobstructed view through the film, due to the inherent nonplanar and wave-like motion of the film immediately in front of the operator, created by the natural movement of the operator while performing a particular function within the isolated chamber. The normal characteristic clarity of the flexible film is retained, as long as the film is retained stretched and taut, since in this manner no wave-like motion will occur. The viewing means 48 comprises a ring or frame 50 of magnetic material such as coated mild steel, and which may be of any convenient shape. In the drawing, the viewing means is shown to be round. However it can be square, rectangular, or any other shape. In the interest of conserving space and obtaining good viewing power, square or rectangular shaped rings may be used. The ring 50 is best shown at FIGURES 9 and 10, and shown to be L-shaped in cross-section, in that it is provided with a leg 52 and flange 54. When the film is stretched taut over the edge 56 of the ring leg 52, it is preferably held in place with means such as a plurality of small magnets 58, as best shown in FIGURES 8 and 9. It has been determined that the use of a plurality of small magnets such as 58, provide a variable and controllable tension in the film material without the danger of perforating the flexible film and also allow the easy removal or change of position of the viewing means, including the ring 50, without damaging or harming the flexible film material in any manner. The flange 54 acts as a backing and the leg 52 as a base to receive the complementary shaped magnet 58, as best shown in FIGURE 9.

FIGURE 10 shows another embodiment of a viewing means 58, and includes the same ring 50 composed of magnetic material, and which is designed to receive a complementary shaped ring or frame 60, having a similarly shaped leg and flange 62 and 64. The ring 60 may either have magnets 58 embedded in the surface of the ring, and therefore, may be of a light plastic material, or as is also contemplated, the ring 60 may be of a nonmagnetic material upon which a plurality of magnets 58 are superposed within the L-shaped groove, as shown in FIGURE 10. The advantage of using the additional ring 60 of nonmagnetic material is that the pull or tension on the film 30 at the edge 56 of the ring is more evenly distributed, thus adding to the life of the film.

While it is not shown, it is also possible to provide a nonskid material such as rubber, on the film side of either or both of the flanges of the rings 50 and 60, if desired. If nonskid material is used, light rings or frames can have a flat cross-section and be of magnetically attracted material. The film can be secured to the ring or frame by a number of magnets gripping the frame direct with no support but the clamping action of the magnet to the frame.

Figure 11:
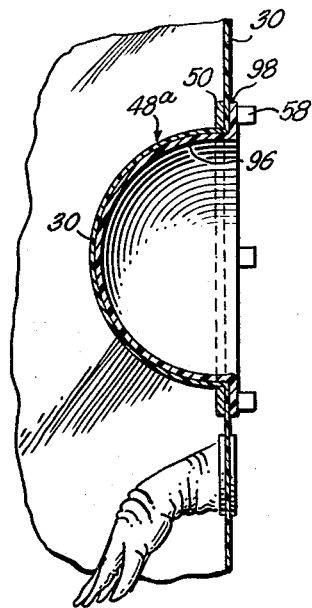
FIGURE 11 is a cross-sectional view of a modified form of viewing means.
Figure 12:
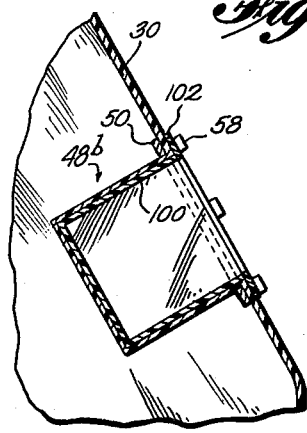
FIGURE 12 is a cross-sectional view of a further modification of a viewing means.

Another embodiment of the viewing means is shown in FIGURES 7, 11 and 12. These variations from the construction of viewing means 48 permit the operator to obtain a more complete view of the interior of the chamber without the formation of any wrinkles or waves being produced. As generally depicted the viewing means 48a and 48b protrude into the isolated volume and include in 48a a concave transparent plastic or glass form 96 having a flange 98 which overlaps the ring or frame 50. Magnets 58 are preferred to sandwich the film between the ring 50 and the flange 98. The film will generally conform to the shape of the form 96 and therefore permit the operator to place his head inside the form for a better view of the interior of the isolated volume.

In the construction of 48b, the viewing means includes a multiple plane frame 100 which has flanges 102 similar to flanges 98. Magnets 58 sandwich the film 30 between the rings 50 and the flanges 102 in a manner similar to that described for viewing means 48a.

Another important feature of the present invention is best shown in solid lines FIGURE 6 and in phantom in FIGURES 1, 5 and 7. As depicted a movable support 104 which may house light fixtures L and which is constructed of a holder tray which may be flat and have flanged edges 108 as shown to receive and hold any tools or implements as desired. This tray is suitably supported by opposed struts or handles 110 which may join at hanger bar 112 that passes through the film 30 at suitably sealed openings 114. The hanger bar is suitably affixed to eyelets 28 which therefore support both the flexible film 30 and also the movable support 104. The unique feature of this construction is that when the operator moves the film by means of the glove ports 44, the movable tray 104 will automatically move with him and therefore continuously provide the convenience of light and tools or other equipment near the operator.

The operation function of the assembly, as outlined, should be manifest. In the event, however, that one of the significant advantages of the present invention is not readily apparent, it is pointed out that in view of the vertical folds of material due to the double length of the enclosing film relative to the surface 12, the volume of the enclosure will remain virtually constant. The reason for this is that in the event an operator standing outside of the enclosure leans into the enclosure, the volume will not increase with an attendant pressure rise, since the folds will be expanded in an amount equal to the change in volume caused by the operator leaning into the enclosure. Thus, the folds will absorb the change in volume and will expand only as is necessary, thus assuring substantially the same volume. It can be seen that this feature is important in the event that contaminating atmosphere is enclosed within the isolator assembly 10, in order that the contaminating atmosphere will not be forced out due to any pressure rise.

While admittance into the enclosure can be by use of the lock 80, it is also within the scope of this invention to provide an opening in an end 38 or 86 of the film 30, which after admittance of the desired person or item into the enclosure, can be sealed as by conventional heat sealing, plastic zipper or chemical means well known in the art.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claims.

I claim:

1. An enclosed working area assembly comprising: a working area surface having a predetermined longitudinal and lateral extent, supporting means extending beneath said surface while engaging and maintaining said surface in a raised position, said supporting means extending longitudinally beyond said surface to provide an unobstructed area beneath said surface, a rigid frame having a frame member extending above and substantially parallel to said surface, a flexible film enclosure slidably secured along said frame member and hanging freely alongside and extending continuously around and out of contact with said working area surface forming a closed loop containing and continuously surrounding said working area surface, said enclosure being at least twice the longitudinal extent of said surface and draping loosely laterally and below said surface in the form of folds, access means in said enclosure, said access means located longitudinally between the ends of said working area surface and permitting working access to the entire longitudinal and lateral extent of said surface for contact with said surface, said enclosure being freely and telescopically movable longitudinally of said surface.

2. The assembly of claim 1 wherein said frame member is secured to said supporting means beyond the longitudinal extent of said surface.

3. The assembly of claim 1 including a movable support tray slidably engaged along said frame member and being within said film enclosure and above said hand ports.

4. The assembly of claim 1 including an access lock means secured to the wall of said enclosure and adapted to permit ingress and egress to said surface, viewing means positioned above the hand ports in the film enclosure including means for stretching taut the film enclosure within the viewing means, a movable support tray above the glove ports adapted to move longitudinally always remaining substantially above the glove ports.

5. The construction of claim 1 wherein a continuous enclosed tunnel, open at its ends is provided within and secured its ends to said enclosure, to form a concentric enclosed volume between said tunnel and said enclosure, said supporting means extending through said tunnel.

6. The construction of claim 5 wherein said tunnel is flexible and integral with said film enclosure at the ends of the said enclosure.

7. The construction of claim 5 including a movable support slidably engaged along said frame member and being within said film enclosure and above said hand ports.

8. The assembly of claim 1 including pressurizing means connected to said enclosure to maintain a gaseous pressure within said enclosure greater than ambient.

9. The assembly of claim 1, wherein the access means is in the form of hand ports on at least one side of said enclosure.

10. The assembly of claim 9 including viewing means positioned above the hand ports in the film enclosure including means for stretching taut the film enclosure within the viewing means, a movable support tray above the hand ports adapted to move longitudinally always remaining substantially above the hand ports.

11. The assembly of claim 10 wherein the means for stretching the film enclosure comprises at least one ring and holding means cooperating with said ring.

12. The assembly of claim 11 wherein magnets are provided along said ring to hold said film taut there between.

13. The assembly of claim 1, wherein said enclosure is vertically supported at a plurality of positions laterally disposed from said frame member.

14. The assembly of claim 1, wherein thte interior of said enclosure is pressurized in use to extend said enclosure.

15. The assembly of claim 1, wherein said enclosure has a lateral width substantially greater than the lateral width of said surface.

16. The assembly of claim 1, wherein said supporting means extending longitudinally beyond said surface includes legs extending down to and in contact with the ground.

17. A film enclosure adapted for use in an enclosed working area assembly to provide an insolated volume surrounding a horizontal support comprising: a flexible film forming enclosure having open opposed slots, a tunnel formed of continuous material integral with said film enclosure at said slots, said tunnel and said film enclosure forming an isolated volume around said tunnel, said film having a length at least approximately twice the distance between slots.

18. A film enclosure adapted for use in an enclosed working area assembly to provide an isolated volume surrounding a horizontal support comprising: a flexible film forming enclosure having open opposed slots, a tunnel formed of continuous material integral with said film enclosure at said slots, said tunnel and said film enclosure forming an isolated volume around said tunnel, said film having a length at least approximately twice the distance between slots, means protruding through said film remote from said tunnel for slidably supporting said enclosure, a movable support within said enclosure and hand ports positioned below said movable support.

19. A film enclosure adapted for use in an enclosed working area assembly to provide an isolated volume surrounding a horizontal support comprising: a flexible film forming enclosure having opposed openings spaced a predetermined distance apart, means forming a tunnel extending between said openings and secured to said film, said openings communicating with said tunnel, the interior of said tunnel being isolated from and without fluid communication with said enclosure, said film having a length approximately twice the distance between said openings.

20. The structure of claim 19, wherein the lateral width of the openings and the tunnel is less than the lateral extent of the film enclosure in order to form an air space between the sides of the tunnel and the sides of the enclosure.

References Cited by the Examiner

UNITED STATES PATENTS

| | | | |
|---|---|---|---|
| 1,342,354 | 6/1920 | Schoonmaker | 135—5.2 |
| 2,473,033 | 6/1949 | Letac | 128—1 |
| 2,786,740 | 3/1957 | Taylor | 128—1 |
| 3,051,163 | 8/1962 | Trexler | 128—1 |
| 3,051,164 | 8/1962 | Trexler | 128—1 |

RICHARD A. GAUDET, *Primary Examiner.*

W. E. KAMM, *Assistant Examiner.*